United States Patent
Padinhakara et al.

(10) Patent No.: US 11,171,811 B2
(45) Date of Patent: Nov. 9, 2021

(54) VEHICLE DATA TRANSFER QUEUEING

(71) Applicant: Ford Global Technologies, LLC, Dearborn, MI (US)

(72) Inventors: Mohammed-Javed Padinhakara, Dearborn, MI (US); Navid Tafaghodi Khajavi, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 116 days.

(21) Appl. No.: 16/591,685

(22) Filed: Oct. 3, 2019

(65) Prior Publication Data
US 2021/0105152 A1   Apr. 8, 2021

(51) Int. Cl.
| H04L 12/54 | (2013.01) |
| H04L 12/40 | (2006.01) |
| G07C 5/00 | (2006.01) |
| H04L 29/08 | (2006.01) |
| G08G 1/01 | (2006.01) |

(52) U.S. Cl.
CPC .......... H04L 12/5692 (2013.01); G07C 5/008 (2013.01); G08G 1/0112 (2013.01); H04L 12/40 (2013.01); H04L 67/12 (2013.01); H04L 2012/40215 (2013.01)

(58) Field of Classification Search
CPC combination set(s) only.
See application file for complete search history.

(56) References Cited

U.S. PATENT DOCUMENTS

| 8,249,910 B2* | 8/2012 | Wellman ................ G05B 15/02 705/7.26 |
| 8,594,933 B2 | 11/2013 | Neugebauer et al. |
| 9,760,846 B1 | 9/2017 | Brandmaier et al. |
| 10,139,834 B2* | 11/2018 | Bai ........................ H04W 4/023 |
| 2004/0010473 A1* | 1/2004 | Hsu ...................... G06Q 20/085 705/77 |
| 2007/0002736 A1* | 1/2007 | Gade .................... H04L 63/1408 370/230 |
| 2009/0177352 A1 | 7/2009 | Grau et al. |
| 2011/0130916 A1* | 6/2011 | Mayer .................... G08G 1/127 701/31.4 |
| 2014/0212139 A1* | 7/2014 | Murata ............... H04L 12/2869 398/66 |
| 2018/0098227 A1* | 4/2018 | Carnelli ............. H04W 64/003 |
| 2019/0317508 A1* | 10/2019 | Zhang ............. G08G 1/096844 |

* cited by examiner

Primary Examiner — Xavier S Wong
(74) Attorney, Agent, or Firm — Frank A. MacKenzie; Bejin Bieneman PLC

(57) ABSTRACT

A computer includes a processor and a memory, the memory storing instructions executable by the processor to receive, from each of a plurality of vehicles, a request to exchange data, each request including metadata about the request; sort the vehicles into a plurality of priority sets determined from the metadata; determine a first set of data transfer lines available for vehicles in a first one of the priority sets; select a first optimal data transfer line from the first set of data transfer lines for a first one of the vehicles in the first priority set; and assign the first optimal data transfer line to the first one of the vehicles.

20 Claims, 3 Drawing Sheets

VEHICLE DATA TRANSFER QUEUEING

BACKGROUND

Vehicles such as automobiles can be equipped with various digital devices, e.g., sensors, electronic control units, etc., that provide data while the vehicle is operating. For examples, devices can provide data on a vehicle communication network such as a Controller Area Network (CAN) bus or the like. Such data can be stored in a computer memory or memories in the vehicle for later retrieval. For example, data collected during vehicle operation can be useful for diagnosing faults, performing maintenance, etc. However, it can be difficult to effectively or efficiently obtain vehicle data.

DETAILED DESCRIPTION

Introduction

Figure 1:
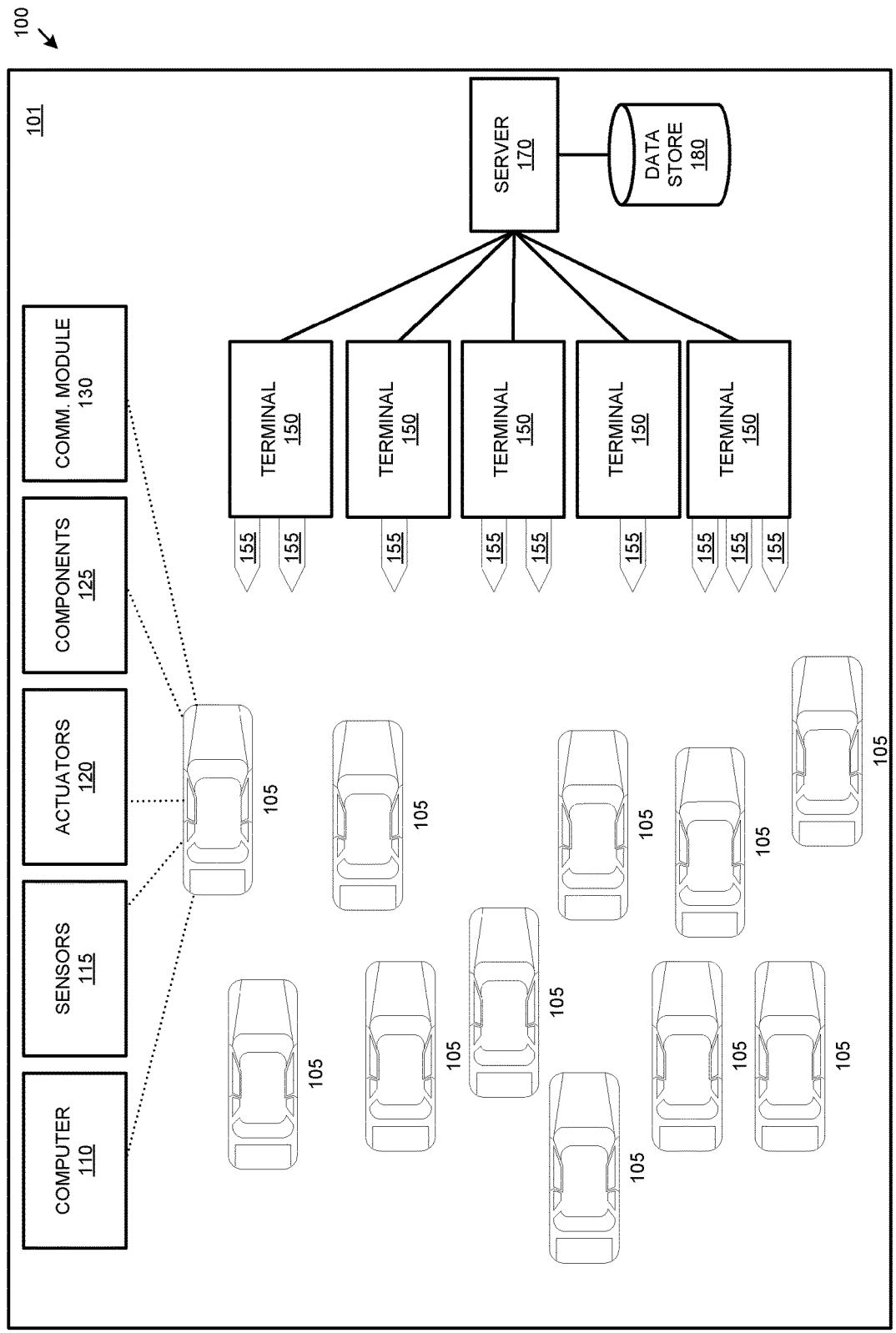
FIG. 1 is a diagram illustrating an example data transfer queueing system.

A system, comprises a computer including a processor and a memory, the memory storing instructions executable by the processor to receive, from each of a plurality of vehicles, a request to exchange data, each request including metadata about the request; sort the vehicles into a plurality of priority sets determined from the metadata; determine a first set of data transfer lines available for vehicles in a first one of the priority sets; select a first optimal data transfer line from the first set of data transfer lines for a first one of the vehicles in the first priority set; and assign the first optimal data transfer line to the first one of the vehicles.

The first optimal data transfer line can be selected based at least in part on determining that a condition is met for a terminal that includes the first optimal data transfer line. An updated line load can be calculated for the first optimal data transfer line by adding a line load for the first one of the vehicles to transfer data to a current line load of the first optimal data transfer line; and determining that a terminal condition is met upon determining that the updated line load does not exceed an amount of bandwidth specified for the terminal that includes the first optimal data transfer line.

Upon determining that a terminal condition is not met the computer can include instructions to modify the first set of data transfer lines by removing the optimal data transfer line from the first set of data transfer lines; and then re-select the first optimal data transfer line from the first set of data transfer lines.

The instructions can further include instructions to determine a second set of data transfer lines available for vehicles in a second one of the priority sets; select a second optimal data transfer line from the second set of data transfer lines for a second one of the vehicles in the second priority set; and assign the second optimal data transfer line to the second one of the vehicles.

The instructions can further include instructions to select the first optimal data transfer line based at least in part on determining data exchange times for each of the data transfer lines in the first set of data transfer lines for the first one of the vehicles; or based at least in part on determining overall service times for data transfers for each of the data transfer lines in the first set of data transfer lines for the first one of the vehicles; and/or based at least in part on determining estimated time for the first one of the vehicles to move from a current location to respective locations for each of the data transfer lines in the first set of data transfer lines.

The instructions can further include instructions to sort the vehicles in each priority set according to an amount of data to be exchanged, wherein the first one of the vehicles has a highest amount of data to be exchanged.

The instructions can further include instructions to adjust a bandwidth threshold for determining the first set of data transfer lines available for vehicles in the first one of the priority sets.

The metadata can include a priority level. The metadata for each vehicle can include one or more of (a) a last time that the vehicle exchanged data or a time for a next scheduled exchange, (b) a time that specifies a number of minutes until the vehicle is next scheduled for service, or (c) an amount of available data storage in a vehicle computer memory.

The first optimal data transfer line can be one of a wired and a wireless connection.

The system can further comprise the first one of the vehicles, wherein the first one of the vehicles includes a first vehicle computer that is programmed to actuate the first vehicle to move to a location to exchange data via the optimal data transfer line.

A method can comprise receiving, from each of a plurality of vehicles, a request to exchange data, each request including metadata about the request; sorting the vehicles into a plurality of priority sets determined from the metadata; determining a first set of data transfer lines available for vehicles in a first one of the priority sets; selecting a first optimal data transfer line from the first set of data transfer lines for a first one of the vehicles in the first priority set; and assigning the first optimal data transfer line to the first one of the vehicles.

The first optimal data transfer line can be selected based at least in part on determining that a condition is met for a terminal that includes the first optimal data transfer line. An updated line load can be calculated for the first optimal data transfer line by adding a line load for the first one of the vehicles to transfer data to a current line load of the first optimal data transfer line; and determining that a terminal condition is met upon determining that the updated line load does not exceed an amount of bandwidth specified for the terminal that includes the first optimal data transfer line.

The method can further comprise determining that a terminal condition is not met and then modifying the first set of data transfer lines by removing the optimal data transfer line from the first set of data transfer lines; and then re-selecting the first optimal data transfer line from the first set of data transfer lines.

The method can further comprise determining a second set of data transfer lines available for vehicles in a second one of the priority sets; selecting a second optimal data transfer line from the second set of data transfer lines for a second one of the vehicles in the second priority set; and assigning the second optimal data transfer line to the second one of the vehicles.

The method can further comprise determining selecting the first optimal data transfer line based at least in part on one or more of (a) determining data exchange times for each of the data transfer lines in the first set of data transfer lines for the first one of the vehicles; (b) determining overall service times for data transfers for each of the data transfer lines in the first set of data transfer lines for the first one of the vehicles; or (c) determining estimated time for the first one of the vehicles to move from a current location to respective locations for each of the data transfer lines in the first set of data transfer lines.

Exemplary System Elements

FIG. 1 is a block diagram of a vehicle data transfer queueing system 100. A plurality of vehicles 105, e.g., commonly operated, maintained, and managed as part of a fleet, can each have a computer 110. As each vehicle 105 operates, data collected during its operation can be stored in a memory of the computer 100. Then, a vehicle may arrive at a depot, garage, maintenance area, or other facility 101 at which the data collected by the vehicle 105 can be uploaded to a data store 180. The facility 101 includes a plurality of data transfer lines 155 in one or more exchange terminals 150, each terminal 150 including one or more data transfer lines 155. A computer server 170 processes metadata about respective vehicles 105 requested to be queued for a data exchange as well as real-time or near real-time data about data transfers conditions in the facility 101, including loads and/or other parameters of various terminals 150 and/or lines 155 to assign individual vehicles to individual lines 155. Further, the server 170 can specify an order for vehicles 105 to access a line 155 when a plurality of vehicle 105 are assigned to a same line 155.

A data exchange means a transfer of digital data, typically according to conventional networking protocols and media, from a first computing device, e.g., a vehicle 105 computer 110, to a second computing device, e.g., the server 170, or vice versa. For convenience, this disclosure may refer to a data offload because a data offload from a vehicle 105 to the server 170 is a very common contemplated scenario. However, it is to be understood that the present disclosure could and is intended to also apply to scenarios where vehicles 105 download data from a server 170 in addition to or in lieu of uploading data. Further, the term "exchange" of data generically describes any offload, upload, or offload/upload scenario.

A vehicle 105 is typically a powered land vehicle such as a car, truck, motorcycle, etc. A vehicle 105 can include a vehicle computer 110, sensors 115, actuators 120 to actuate various vehicle components 125, and a vehicle communications module 130. The communications module 130 allows the vehicle computer 110 to communicate with other computing devices, such as other vehicle computers 110 and the server 170.

A vehicle computer 110 includes a processor and a memory such as are known. The memory includes one or more forms of computer-readable media, and stores instructions executable by the computer 110 for performing various operations, including as disclosed herein.

The computer 110 may operate a vehicle 105 in an autonomous, a semi-autonomous mode, or the vehicle 105, in some examples, additionally has capability for operation in a non-autonomous (or manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate components 125 including one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 105 network such as a communications bus as described further below, more than one processor, e.g., included in electronic controller units (ECUs) or the like included in the vehicle for monitoring and/or controlling various vehicle components 125, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 105 network, the computer 110 may transmit messages to various devices in the vehicle and/or receive messages (e.g., CAN messages) from the various devices, e.g., sensors 115, an actuator 120, a human machine interface (HMI), etc. Alternatively or additionally, in cases where the computer 110 actually comprises a plurality of devices, the vehicle 105 communication network may be used for communications between devices represented as the computer 110 in this disclosure. Further, as mentioned below, various controllers and/or sensors 115 may provide data to the computer 110 via the vehicle communication network.

Vehicle 105 sensors 115 may include a variety of devices such as are known to provide data to the computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be detected by sensing physical phenomena (e.g., light or other electromagnetic waves, or sound, etc.), e.g., phenomena detectable by sensors 115.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 101, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2I) wireless communications to another vehicle, to an infrastructure element 140 (typically via direct radio frequency communications) and/or (typically via the network 135) the server 170. The module 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 Bluetooth®, Bluetooth® Low Energy (BLE), IEEE 802.11, vehicle-to-vehicle (V2V) such as Dedicated Short Range Communications (DSRC), cellular vehicle-to infrastructure ("cellular V2X), etc.), local area networks (LAN) and/or wide area networks (WAN), including the Internet, providing data communication services.

As mentioned above, a facility 101 can include one or more terminals 150, each terminal including one or more data transfer lines 155. A terminal 150 is or includes a computing device including a processor and a memory, as well as lines 155. A line 155 can include any suitable wired or wireless mechanism for transferring digital data. In one example, each terminal 150 includes a plurality lines 155, where each line 155 includes a conventional wireless access point and a wired connection (e.g., Ethernet or the like) to the server 170 and/or data store 180.

The server 170 can be a conventional computing device, i.e., including one or more processors and one or more memories, programmed to provide operations such as disclosed herein.

The data store 180 include one or more computer readable media suitable for storing digital data, and may be included in and/or accessible via the server 170 or some other computing device. That is, the data store 180 can provide any conventional database access, for example. The data store 180 may be provided to collect and/or aggregate operating data from a plurality of vehicles 105. For example, the data store 180 may include data for each of a plurality of vehicles describing, e.g., for specified periods of time, data such as distances covered (e.g., mileage), average speeds, detected fault conditions, deployment of safety devices, energy efficiency (e.g., gasoline mileage), fuel levels, lubricant and/or other fluid levels, just to name some examples of vehicle 105 operating data that can be transferred to the data store 180.

Data Elements

Assume that a facility 101 in the system 100 includes r lines 155, each terminal 150 having one or more of the lines 155, and that n vehicles 105 are queued to upload data to the data store 180 via one of the lines 155 (as should be clear, r and n are integers). The following variables are defined, where i is an index specifying a vehicle 105 (i.e., $1 \leq i \leq n$), and j is an index specifying a line 155 (i.e., $1 \leq j \leq r$):

| Variable | Definition |
| --- | --- |
| $S_{ij}$ | Maximum data transfer speed (e.g., in megabytes per second) for an $i^{th}$ vehicle 105 to offload data using an $j^{th}$ line 155. Typically determined as the maximum of transfer speed capacities of the vehicle 105 and the line 155, e.g., as specified by respective networking or communications equipment manufacturers. |
| $D_i$ | Total amount of data (e.g., in megabytes) for an $i^{th}$ vehicle 105 to offload. |
| $E_{ij}$ | Estimated amount time for an $i^{th}$ vehicle 105 to reach an $j^{th}$ line 155, e.g., to move from a current location to a location in a vehicle queue to a point at which the vehicle 105 can be assigned to the $j^{th}$ line 155. |
| $\overline{U_{min}}$ | Minimum amount of bandwidth to be reserved in each terminal 150 for emergency communications, i.e., for each terminal 150 to meet any ad-hoc/emergency data transfer needs. |
| $U_j$ | Current bandwidth load measured on an $j^{th}$ line 155. |
| $O_{ij}$ | Amount of time for an $i^{th}$ vehicle 105 to offload data via an $j^{th}$ line 155, including the pre-connection time $\overline{O_{ij}}$. |
| $\overline{O_{ij}}$ | Amount of pre-connection time specified for an $i^{th}$ vehicle 105 to connect to an $j^{th}$ line 155, e.g., typically includes an estimated travel time for the vehicle 105 to move to a point of physically or wirelessly connecting to the line 155, based on an amount of time for a vehicle 105 to travel from a point at which a vehicle is queued to a point at which a connection to a line 155 in the terminal 150 can be established, plus a time to establish he connection (which can depend on whether the connection is wired or wireless). |
| $T_{ij}$ | An overall amount of time needed for an $i^{th}$ vehicle 105 to offload data using an $j^{th}$ line 155. |
| $P_i$ | A priority assigned to an $i^{th}$ vehicle 105, e.g., on a scale of 1-5 or 1-10, with 1 being a highest priority, or as a binary (1/0 or yes/no, etc.) indicator specifying that a vehicle 105 does or does not have priority. |
| L | Set of r lines available for vehicles 105 to offload data at a given time (which may not be all lines 155 on all terminals 155 in the system 100). |

Note that a reserved bandwidth could be dynamically determined, e.g., could be determined periodically or substantially in real time, based on a current condition for a line 155 and/or terminal 150. For example, a vehicle computer 110 could unexpectedly fill disk storage in in its memory due to an influx of data generated from a severe weather or driving condition (e.g., severe wind, sever rain, road construction, etc.). Such conditions, for example, could result in the computer 110 storing more sensor data, e.g., lidar and radar data, that when operating without such atypical conditions. When a computer 110 memory is full, a reserved bandwidth requirement could be reduced or eliminated to the urgent need of the vehicle 105 computer 110 to offload data. In another example, the server 170 could determine that a vehicle 105 urgently requires a security update, and could reduce or eliminate the reserved bandwidth for a line 155 to allow the security update to proceed. Historical or empirically obtained data could be used to determine when to adjust or eliminate a reserved bandwidth requirement, e.g., data could specify that when a weather condition exists in an area, a security update is available, etc., to reduce or eliminate the reserved bandwidth requirement. Alternatively or additionally, a vehicle 105 computer 110 could specify to the server 170 a need for urgent data offload, e.g., that a memory is full.

Vehicle Priority

A vehicle 105 computer 110 can store and provide to the server 170 various metadata, i.e., data about data to be offloaded by the computer 110 and/or parameters or constraints of the offload process. This metadata can include a priority level $P_i$ of the vehicle 105. Alternatively or additionally, metadata provided to the server 170 could include data from which the server 170 could determine the priority level. For example, a vehicle 105 could provide priority or some other identifier specifying that the vehicle 105 is an emergency vehicle meriting a highest level of priority. In such case, the server 170 could be programmed to assign the highest level of priority to such vehicle 105 without regard to metadata from which priority could be derived. However, other vehicles 105 could specify lower levels of priority and/or could provide metadata from which a vehicle 105 priority could be determined. In some cases, the server 170 could be programmed to simply use any priority provided by a vehicle 105 and to default to a lowest level of priority for a vehicle 105 if none is provided. In other cases, the server 170 could be programmed to use a priority provided only by vehicles 105 having a highest level of priority, and to determine priority for other vehicles 105 based on metadata. In yet other cases, the server 170 could be programmed to determine a priority or all vehicles 105 based on metadata.

Metadata used to determine a priority could include, without limitation, a last time (i.e., date and/or time of day) that the vehicle 105 offloaded data and/or a time for a next scheduled offload, for example, a number of minutes NO until the next scheduled offload, a time that specifies a number of minutes NS until the vehicle 105 is next scheduled for service, and/or an amount of available data storage AS in a computer 110 memory remaining beyond the amount of data $D_i$ currently stored in a computer 110 memory and ready for offload. Based on such data, the server 170 could then determine a priority $P_i$ level or value for a vehicle 105, e.g., according to an equation such as:

$$P_i = w_1 * AS + w_2 * NO + w_3 * NS \qquad (1)$$

where $w_1$, $w_2$, and $w_3$ are weights to control for the respective importance is of the factors AS, NO, and NS.

In the example of Equation (1), disregarding units, vehicles 105 could be assigned priorities in an ascending order based on their respective values $P_i$, that is, a lowest value for $P_i$ in this example means a highest priority. Further, the weights could be omitted, but could be useful for emphasizing for deemphasizing a factor over the others. To take just one example, an emergency vehicle such as an ambulance or rescue vehicle could have a low value for the number of minutes NS until the vehicle 105 is next scheduled for service, and further are a weight $w_3$ could be set to a low value, e.g., 0.25, to further emphasize this factor. Further, to help standardize values for priorities $P_i$, a rounding function could be applied to the result of Equation (1), e.g., a floor function or a round to the nearest integer function, to obtain an integer value.

Based on determined priorities $P_i$, vehicles 105 can be assigned to a respective priority set in a plurality of priority sets. That is, a range of possible values for priorities $P_i$ could be determined, and each set could cover a sub-range. For example, priority values could range from 1 to 5, whereupon five sets could be defined: a first set where $P_i=1$, a second set where $1<P_i \le 2$, a third set where $2<P_i \le 3$, a fourth set where $3<P_i \le 4$, and a fifth set where $4<P_i \le 5$.

Processing

Figure 2:
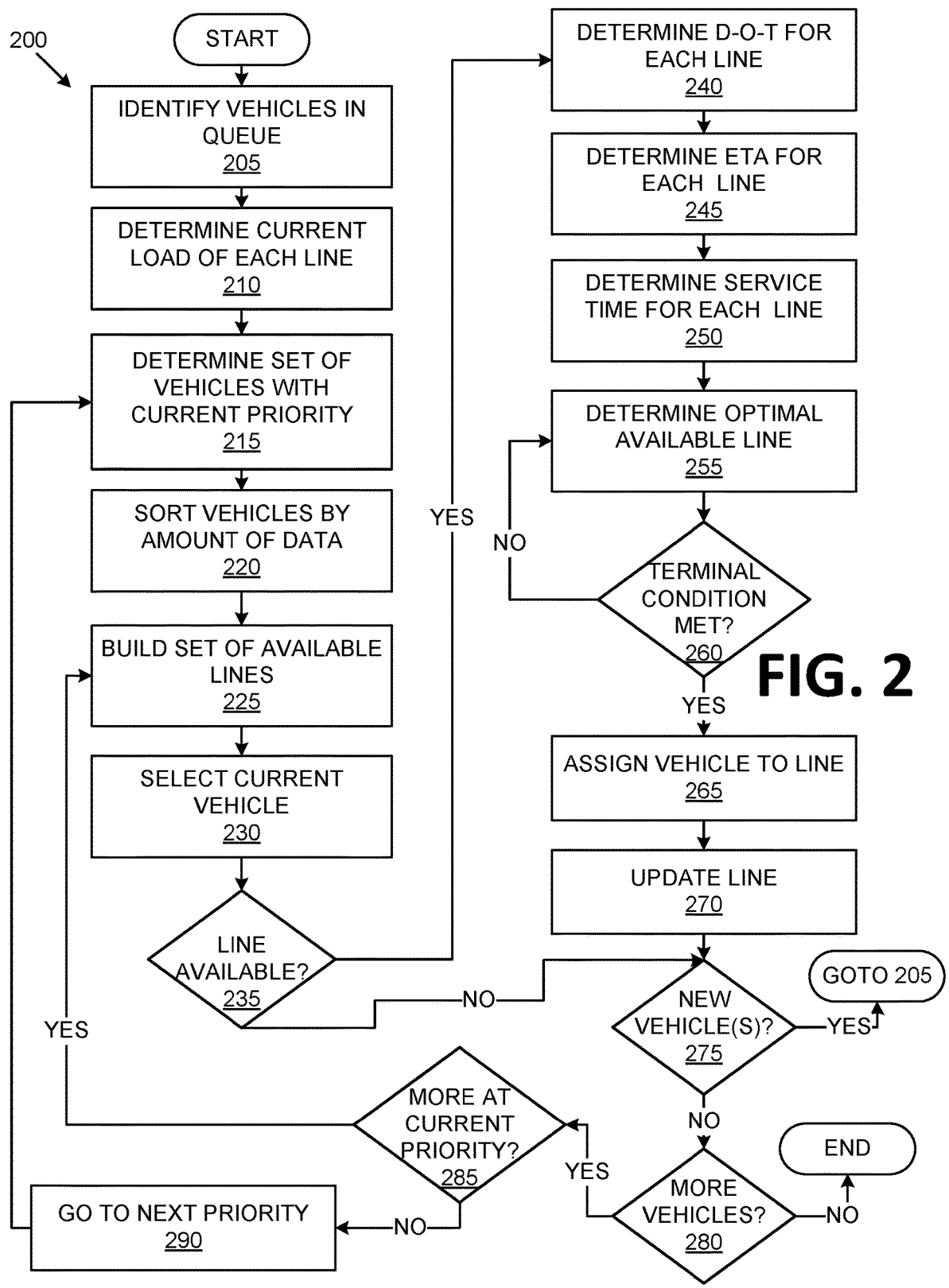
FIG. 2 is a flowchart of an exemplary process for assigning vehicles to lines.

FIG. 2 is a flowchart of an exemplary process 200 for assigning vehicles 105 to lines 155. For example, the process 200 can be carried out by a processor of the server 170 executing program instructions stored in a memory of the server 170.

The process 200 begins in a block 205, in which the server 170 identifies vehicles 105 queuing for data offload at a facility 101. For example, the server 170 could identify vehicles 105 arriving within a specified period of time, e.g., 60 seconds, 10 minutes, 60 minutes, etc., or the process 200 could begin when two or more vehicles 105 have arrived and are requesting a data upload within a specified period of time, e.g., one minute, two minutes, etc. Typically the server 170 will identify a vehicle 105 queuing for data based on receiving a message, e.g., via a V2X communication mechanism or the like, from the vehicle 105, including a vehicle 105 identifier such as a vehicle identification number (VIN) or other substantially unique identifier that can be used to identify and track a vehicle 105, requesting to offload data and/or notifying the server 170 that the vehicle 105 is present or is expected to arrive within a specified time at the facility 101. For example, a vehicle 105 could provide a message, e.g., via protocol such as discussed above, to the server 170 that the vehicle is en route and expected to arrive at a specified time and/or could provide a current location with the notification that the vehicle 105 is en route to the facility 101. Thus, in the block 205, the server 170 could identify, as vehicles 105 queuing for data offload at a facility 101, vehicles 105 present at the facility 101 and/or vehicles 105 expected to be present at the facility 101 at or within a specified time.

Further, the vehicle 105 can provide, in a message to the server 170, additional data, referred to as vehicle 105 metadata because it is data about the data that the vehicle 105 has to offload, and/or values describing data transfer capabilities of the vehicle 105, possibly including, without limitation, a priority level $P_i$ assigned to the vehicle 105, an amount of data that the vehicle 105 has to offload, a last date and/or time that the vehicle 105 offloaded data, one or more network protocols that the vehicle 105 can support, e.g., ethernet, Wi-Fi, Bluetooth, etc., as well as other metadata such as discussed above for determining the priority level for a vehicle.

Next, in a block 210, the server 170 determines a current load $U_j$, i.e., a current amount of data being processed, for each line 155 in the facility 101. For example, a load can be specified in as an amount of data being sent and/or received via the line 155 at a current time or as an average over a specified period of time, e.g., according to conventional network monitoring techniques. The load can be specified as, for example, megabits per second (Mbps).

Next, in a block 215, the server 170 identifies vehicles 105 in the vehicles 105 identified in the block 205 whose priority $P_i$ is a current priority level, e.g., in a current priority set. A priority level priority $P_i$ for a vehicle 105 can be determined and/or a vehicle 105 can be assigned to a priority set as described above. Upon an initial iteration of the block 215, i.e., when the process 200 is initialized, the current priority level is set to a highest priority level, e.g., a priority level 1 when possible priority levels range from 1 to 5, or could be 1 or 0. Further, a priority level can be adjusted, e.g., incremented or a different priority set selected for processing, as described below with respect to a block 290.

Next, in a block 220, the server 170 sorts the vehicles 105 identified in the block 215, i.e., vehicles 105 of a same and current priority level $P_i$, according to an amount of data $D_i$ that each vehicle 105 has to offload, typically in an order starting with the vehicle 105 having the most data to offload descending in order to the vehicle 105 having the least data to offload.

Next, in a block 225, the server 170 builds a set L of available lines 155 for the vehicles identified in the block 215. Typically, the server 170 iterates through all lines 155 in the facility 101 that are included in terminals 150 that are activated. A line 155 is selected for the set if a current load $U_j$ for the line 155 is below a threshold. The threshold can be specific for an individual line 155. For example, a line 155 may have a bandwidth capacity, e.g., expressed in Mbps. The threshold for a line 155 can be an amount less than its bandwidth capacity selected to allow the line 155 to handle an additional offload assuming an average or typical amount of data $D_i$ for a vehicle 105. Further, the threshold for a line 155 could subtract further from its bandwidth capacity to account for a required amount of bandwidth to be reserved, e.g., for emergency and/or system communications. Yet further, the threshold could be dependent on a priority of vehicles 105 being considered for the line 155. For example, the threshold for a permissible current load $U_j$ for the line 155 could be higher if vehicles 105 have a highest priority $P_i$, e.g., a reserve as discussed above for emergency or system bandwidth consumption could be removed, and then the threshold could be lower for vehicles 105 priorities lowest than the highest priority $P_i$.

Next, in a block 230, the server 170 selects a current vehicle from the set of vehicles determined in the block 215, starting with a first vehicle determined in the block 220, and proceeding in the order determined in the block 220 in subsequent iterations of the block 230.

Next, in a block 240, for the current vehicle 150 having index i, the server 170 computes a data offload time (DOT) $O_{ij}$, for each line 155 in the set L, e.g., as follows:

$$O_{ij} = \frac{D_i}{S_{ij}} + \overline{O_{i,j}} \quad (2)$$

where i and j are index numbers for individual vehicles 105 and lines 155, as explained above. Further, the pre-connection time $\overline{O_{ij}}$ can be determined Yet further, a time for a vehicle computer 110 two connected to a line 155 can be added to the pre-connection time $\overline{O_{ij}}$, e.g., the server 170 can store average connection times for various types of connections, e.g., ethernet, Wi-Fi, etc., provided for a line 155.

Next, in a block 245, for the current vehicle 150 having index i, the server 170 computes an ETA $E_{ij}$, for each line 155 in the set L, e.g., based on determining a time for the vehicle 105 having index i to travel from a current location, e.g., a location from which a vehicle 105 sends a message to the server 170 indicating that the vehicle 105 is arriving at the facility 101 within a specified time for a data offload, to a location for being assigned to the line 155 having index j, e.g., a location at which the vehicle 105 is determined to be present in the facility in the block 205. Known algorithms for determining a route and for determining a time to traverse a route can be used, including taking into account obstacles such as other vehicles 105 and/or when such obstacles may move, and/or a vehicle 105 could provide an estimated time of arrival to the server 170.

Next, in a block 250, for the current vehicle 150 having index i, the server 170 computes an overall service time $T_{ij}$, for each line 155 in the set L, e.g., $$T_{ij} = O_{ij} + \text{Max}(U_j, E_{ij})$$

where $U_j$ in Equation (3) represents an amount of time to offload an amount of data $D_i$ at the bandwidth $U_j$.

Next, in a block 255 the server 170 identifies the line 155 in the set L having a lowest overall service time $T_{ij}$ for the current vehicle 105 (or by randomly selecting between lines 155 having a same and lowest overall service time $T_{ij}$). The identified line 155, having been determined to be optimal thus far for the current vehicle 105, can be referred to as j*.

Next, in a block 260, the server 170 determines whether a terminal condition is met, i.e., whether a condition is met for the terminal 150 that includes the line 155 identified in the block 255 for the line 155 to be able to provide a data offload to the current vehicle 105. A process for determining whether a terminal condition is met is described with respect to FIG. 3, below. Note that the block 260 and the process 300 could be omitted from the process 200, but this could result in assigning a vehicle 105 to a line 155 unable to accommodate the vehicle 105 due to conditions in a terminal 150 including the line 155, delaying data offload of the vehicle 105. If the terminal condition is not met, then the server 170 removes the line 155 identified in the block 255 from the set L, and returns to the block 255. Otherwise, the process 200 proceeds to a block 265.

In the block 265, the server 170 assigns the current vehicle 105 to the line 155 identified in the block 255. The block 265 typically includes the server 170 providing the assignment, e.g., in a wireless message such as described above, to the current vehicle 105. Upon receiving the assignment, or at a specified time that may be provided in a message from the server 170, the vehicle 105, e.g., according to programming in the computer 110, can actuate components 120 to move the vehicle to a location for offloading data to the identified line 155.

Next, in the block 270, the server 170 updates the current bandwidth $U_j$ for the line 155 assigned to the current vehicle 105 in the block 265, i.e., to account for the bandwidth that will be consumed by the current vehicle 105, e.g., as in Equation (4):

$$U_{j*} = U_{j*} + T_{ij*} \quad (4)$$

Next, in a block 275, the server 170 determines whether any new vehicles 105 have arrived at the facility 101 to be queued for a line 155. If so, then the process returns to the block 205 to add the new vehicle(s) 105 to the queue, and to begin a new execution of the process 200, i.e., starting with the block 210 following the block 205. Otherwise, the process 200 proceeds to a block 280.

In the block 280, the server 170 determines whether any vehicles 105 remain to be processed from the set of vehicles identified as queueing in the facility 101 in the block 205. If not, then the process 200 ends. Otherwise, the process 200 proceeds to a block 285.

In the block 285, the server 170 determines whether any vehicles 105 remain to be processed from the vehicles 105 determined to have a current priority as described above with respect to the block 215. If so, then the process 200 returns to the block 225, to redetermine the set in light of assigning a vehicle 105 to a line 155 and updating the bandwidth of the line 155 as described with respect to the blocks 265, 270.

In the block 290, the server 170 increments or decrement or otherwise identifies a next priority or priority set to be processed, and the process 200 returns to the block 215 to identify vehicles 105 with that new current priority.

Figure 3:
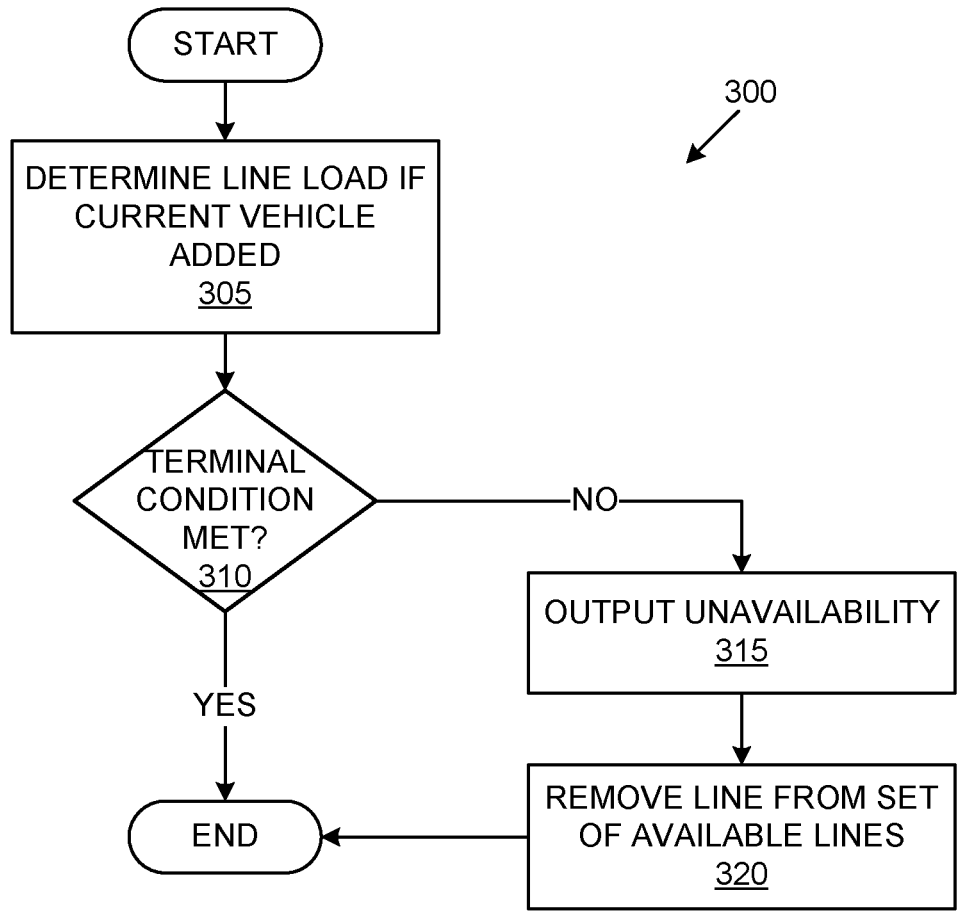
FIG. 3 is a flowchart of an exemplary process for determining whether a terminal condition is met.

FIG. 3 is a flowchart of an exemplary process 300 for determining whether a terminal condition is met. The process 300 can be carried out by a processor of the server 170 executing program instructions stored in a memory of the server 170. The process 300 is typically a subprocess of the process 200 described above, and assumes that a current vehicle 105 has been identified, and that a line 155j* has been identified for the vehicle 105.

The process 300 begins in a block 305, in which the server 170 determines a load, i.e., predicted bandwidth $U_{j*}$ for the line 155j* being considered for being assigned to the current vehicle 105, e.g., according to Equation (4) above.

Next, the server 170 evaluates the terminal 150 that includes the line 155j*, i.e., determines whether the terminal condition is met, i.e., whether the terminal 150 can provide the bandwidth to be provided by the line 155j*. For example, the server 170 can evaluate:

$$\min_{j \in Tm_{j*}} U_j \leq \overline{U_{min}} \quad (5)$$

That is, the server 170 can determine whether, for all lines 155 in the terminal 150 that includes the line 155j*, sufficient bandwidth will remain after the current vehicle 105 is allocated to the line 155j*. If the terminal condition is met, e.g., Equation (5) evaluates to true, then the process 300 ends, e.g., can return to the process 200. Otherwise, the process 300 proceeds to a block 315.

In the block 315, the server 170 outputs data specifying that the line 155j* could not be assigned to the current vehicle 105 because the terminal condition would be violated. For example, the server 170 could write this information to a log file and/or provide output, e.g., in the form of an alert to a display device in the facility 101.

Next, in a block 320, the server 170 removes the line 155j* from the set L of available lines 155.

Following the block 320, the process 300 ends.

Conclusion

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

"Based on" encompasses "based wholly or partly on."

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   receive, from each of a plurality of vehicles, a request to exchange data, each request including metadata about the request;
   sort the vehicles into a plurality of priority sets determined from the metadata;
   from a plurality of data transfer lines, each provided from one of a plurality of terminals, determine a first set of data transfer lines available for vehicles in a first one of the priority sets, wherein each terminal includes a processor, a memory, and a connection to at least one of the data transfer lines;
   select a first optimal data transfer line from the first set of data transfer lines for a first one of the vehicles in the first priority set;
   assign the first optimal data transfer line to the first one of the vehicles;
   determine a second set of data transfer lines available for vehicles in a second one of the priority sets;
   select a second optimal data transfer line from the second set of data transfer lines for a second one of the vehicles in the second priority set; and
   assign the second optimal data transfer line to the second one of the vehicles.

2. The system of claim 1, wherein the instructions further include instructions to select the first optimal data transfer line based at least in part on determining that a condition is met for a terminal that includes the first optimal data transfer line.

3. The system of claim 2, wherein the instructions further include instructions to:
   calculate an updated line load for the first optimal data transfer line by adding a line load for the first one of the vehicles to transfer data to a current line load of the first optimal data transfer line; and
   determine that a terminal condition is met upon determining that the updated line load does not exceed an amount of bandwidth specified for the terminal that includes the first optimal data transfer line.

4. The system of claim 1, wherein the instructions further include instructions to, upon determining that a terminal condition is not met:
   modify the first set of data transfer lines by removing the optimal data transfer line from the first set of data transfer lines; and
   then re-select the first optimal data transfer line from the first set of data transfer lines.

5. The system of claim 1, wherein the instructions further include instructions to select the first optimal data transfer line based at least in part on determining data exchange times for each of the data transfer lines in the first set of data transfer lines for the first one of the vehicles.

6. The system of claim 1, wherein the instructions further include instructions to select the first optimal data transfer line based at least in part on determining overall service times for data transfers for each of the data transfer lines in the first set of data transfer lines for the first one of the vehicles.

7. The system of claim 1, wherein the instructions further include instructions to select the first optimal data transfer line based at least in part on determining estimated time for the first one of the vehicles to move from a current location to respective locations for each of the data transfer lines in the first set of data transfer lines.

8. The system of claim 1, wherein the instructions further include instructions to sort the vehicles in each priority set according to an amount of data to be exchanged, wherein the first one of the vehicles has a highest amount of data to be exchanged.

9. The system of claim 1, wherein the instructions further include instructions to adjust a bandwidth threshold for determining the first set of data transfer lines available for vehicles in the first one of the priority sets.

10. The system of claim 1, wherein the metadata includes a priority level.

11. The system of claim 1, wherein the metadata for each vehicle includes one or more of (a) a last time that the vehicle exchanged data or a time for a next scheduled exchange, (b) a time that specifies a number of minutes until the vehicle is next scheduled for service, or (c) an amount of available data storage in a vehicle computer memory.

12. The system of claim 1, wherein the first optimal data transfer line is one of a wired and a wireless connection.

13. The system of claim 1, further comprising the first one of the vehicles, wherein the first one of the vehicles includes a first vehicle computer that is programmed to actuate the first vehicle to move to a location to exchange data via the optimal data transfer line.

14. A system, comprising a computer including a processor and a memory, the memory storing instructions executable by the processor to:
   receive, from each of a plurality of vehicles, a request to exchange data, each request including metadata about the request;
   sort the vehicles into a plurality of priority sets determined from the metadata;
   from a plurality of data transfer lines, each provided from one of a plurality of terminals, determine a first set of data transfer lines available for vehicles in a first one of the priority sets, wherein each terminal includes a processor, a memory, and a connection to at least one of the data transfer lines;

select a first optimal data transfer line from the first set of data transfer lines for a first one of the vehicles in the first priority set based at least in part on determining that a condition is met for a terminal that includes the first optimal data transfer line;

assign the first optimal data transfer line to the first one of the vehicles;

calculate an updated line load for the first optimal data transfer line by adding a line load for the first one of the vehicles to transfer data to a current line load of the first optimal data transfer line; and determine that a terminal condition is met upon determining that the updated line load does not exceed an amount of bandwidth specified for the terminal that includes the first optimal data transfer line.

15. The system of claim 14, wherein the instructions further include instructions to, upon determining that a terminal condition is not met:

modify the first set of data transfer lines by removing the optimal data transfer line from the first set of data transfer lines; and then re-select the first optimal data transfer line from the first set of data transfer lines.

16. A system, comprising a computer including a processor and a memory, the memory storing instructions executable by the processor to:

receive, from each of a plurality of vehicles, a request to exchange data, each request including metadata about the request;

sort the vehicles into a plurality of priority sets determined from the metadata, including sorting the vehicles in each priority set according to an amount of data to be exchanged, wherein the first one of the vehicles has a highest amount of data to be exchanged;

from a plurality of data transfer lines, each provided from one of a plurality of terminals, determine a first set of data transfer lines available for vehicles in a first one of the priority sets, wherein each terminal includes a processor, a memory, and a connection to at least one of the data transfer lines;

select a first optimal data transfer line from the first set of data transfer lines for a first one of the vehicles in the first priority set; and assign the first optimal data transfer line to the first one of the vehicles.

17. The system of claim 16, wherein the instructions further include instructions to select the first optimal data transfer line based at least in part on determining data exchange times for each of the data transfer lines in the first set of data transfer lines for the first one of the vehicles.

18. The system of claim 16, wherein the instructions further include instructions to select the first optimal data transfer line based at least in part on determining overall service times for data transfers for each of the data transfer lines in the first set of data transfer lines for the first one of the vehicles.

19. The system of claim 16, wherein the instructions further include instructions to select the first optimal data transfer line based at least in part on determining estimated time for the first one of the vehicles to move from a current location to respective locations for each of the data transfer lines in the first set of data transfer lines.

20. The system of claim 16, wherein the instructions further include instructions to adjust a bandwidth threshold for determining the first set of data transfer lines available for vehicles in the first one of the priority sets.

* * * * *